United States Patent
Kuehner et al.

(10) Patent No.: US 12,441,372 B2
(45) Date of Patent: Oct. 14, 2025

(54) AUTONOMOUS VEHICLE OPERATOR ENGAGEMENT

(71) Applicant: Woven by Toyota, Inc., Tokyo (JP)

(72) Inventors: Manuel Ludwig Kuehner, Mountain View, CA (US); Hiroshi Yasuda, San Francisco, CA (US)

(73) Assignee: Woven By Toyota, Inc., Tokyo (JP)

( * ) Notice: Subject to any disclaimer, the term of this patent is extended or adjusted under 35 U.S.C. 154(b) by 195 days.

(21) Appl. No.: 18/096,321

(22) Filed: Jan. 12, 2023

(65) Prior Publication Data

US 2024/0239380 A1    Jul. 18, 2024

(51) Int. Cl.
*B60W 60/00*    (2020.01)

(52) U.S. Cl.
CPC ..... *B60W 60/0053* (2020.02); *B60W 2554/40* (2020.02); *B60W 2555/20* (2020.02); *B60W 2556/45* (2020.02)

(58) Field of Classification Search
CPC ......... B60W 2554/40; B60W 2555/20; B60W 2556/45; B60W 50/14; B60W 60/0053
See application file for complete search history.

(56) References Cited

U.S. PATENT DOCUMENTS

| | | | | |
|---|---|---|---|---|
| 10,481,602 | B2 * | 11/2019 | Chandy | B62D 5/0424 |
| 10,803,525 | B1 * | 10/2020 | Augustine | G06Q 40/08 |
| 11,472,421 | B1 * | 10/2022 | Lundsgaard | G01M 17/007 |
| 2016/0207537 | A1 * | 7/2016 | Urano | B60W 50/082 |
| 2017/0248954 | A1 * | 8/2017 | Tomatsu | B60W 50/082 |
| 2017/0261981 | A1 * | 9/2017 | Ichikawa | B60W 50/082 |
| 2017/0334458 | A1 * | 11/2017 | Sato | B60W 50/082 |
| 2020/0331488 | A1 * | 10/2020 | Hirate | B60K 35/654 |
| 2021/0061312 | A1 * | 3/2021 | Wang | B60W 60/0015 |
| 2021/0316765 | A1 * | 10/2021 | Hardå | B60K 35/00 |
| 2022/0161811 | A1 | 5/2022 | Lu et al. | |
| 2022/0258771 | A1 * | 8/2022 | Chung | B60W 50/14 |
| 2023/0139933 | A1 * | 5/2023 | Tam | G06Q 50/40 701/26 |
| 2023/0150552 | A1 * | 5/2023 | Liu | B60W 60/0059 701/23 |
| 2024/0083466 | A1 * | 3/2024 | Jang | B60W 60/0053 |

FOREIGN PATENT DOCUMENTS

DE     102015207023 A1 * 10/2016 ........... G09B 19/167

* cited by examiner

*Primary Examiner* — Babar Sarwar
(74) *Attorney, Agent, or Firm* — Christopher G. Darrow; Darrow Mustafa PC

(57) ABSTRACT

Systems, methods, and other embodiments described herein relate to keeping an operator of a host vehicle that is semi-autonomous or autonomous engaged. In one embodiment, a method includes determining whether a disengagement ratio of the host vehicle is below a predetermined threshold value and determining whether driving conditions at an upcoming road segment are conducive for disengagement of autonomous vehicle control in the host vehicle. The method includes disengaging the autonomous vehicle control in the host vehicle in response to at least the disengagement ratio being below the predetermined threshold value and the driving conditions being conducive for the disengagement of the autonomous vehicle control.

20 Claims, 4 Drawing Sheets

AUTONOMOUS VEHICLE OPERATOR ENGAGEMENT

TECHNICAL FIELD

The subject matter described herein relates, in general, to systems and methods for keeping an autonomous vehicle operator engaged.

BACKGROUND

An operator of an autonomous or semi-autonomous vehicle has to remain engaged in case the vehicle has to switch to manual control. However, the vehicle operating autonomously or semi-autonomously without incident for a long period may cause the operator to be less attentive and have a delayed response when a switch to manual control occurs.

SUMMARY

In one embodiment, a system for keeping an operator of a host vehicle that is semi-autonomous or autonomous engaged is disclosed. The system includes one or more processors, and a memory in communication with the one or more processors. The memory stores a control module including instructions that, when executed by the one or more processors, cause the one or more processors to determine whether a disengagement ratio of a host vehicle is below a predetermined threshold value, determine whether driving conditions at an upcoming road segment are conducive for disengagement of autonomous vehicle control in the host vehicle, and disengage the autonomous vehicle control in the host vehicle in response to at least the disengagement ratio being below the predetermined threshold value and the driving conditions being conducive for the disengagement of the autonomous vehicle control.

In another embodiment, a method for keeping an operator of a host vehicle that is semi-autonomous or autonomous engaged is disclosed. The method includes determining whether a disengagement ratio of a host vehicle is below a predetermined threshold value, determining whether driving conditions at an upcoming road segment are conducive for disengagement of autonomous vehicle control in the host vehicle, and disengaging the autonomous vehicle control in the host vehicle in response to at least the disengagement ratio being below the predetermined threshold value and the driving conditions being conducive for the disengagement of the autonomous vehicle control.

In another embodiment, a non-transitory computer-readable medium for keeping an operator of a host vehicle that is semi-autonomous or autonomous engaged and including instructions that when executed by one or more processors cause the one or more processors to perform one or more functions is disclosed. The instructions include instructions to determine whether a disengagement ratio of a host vehicle is below a predetermined threshold value, determine whether driving conditions at an upcoming road segment are conducive for disengagement of autonomous vehicle control in the host vehicle, and disengage the autonomous vehicle control in the host vehicle in response to at least the disengagement ratio being below the predetermined threshold value and the driving conditions being conducive for the disengagement of the autonomous vehicle control.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
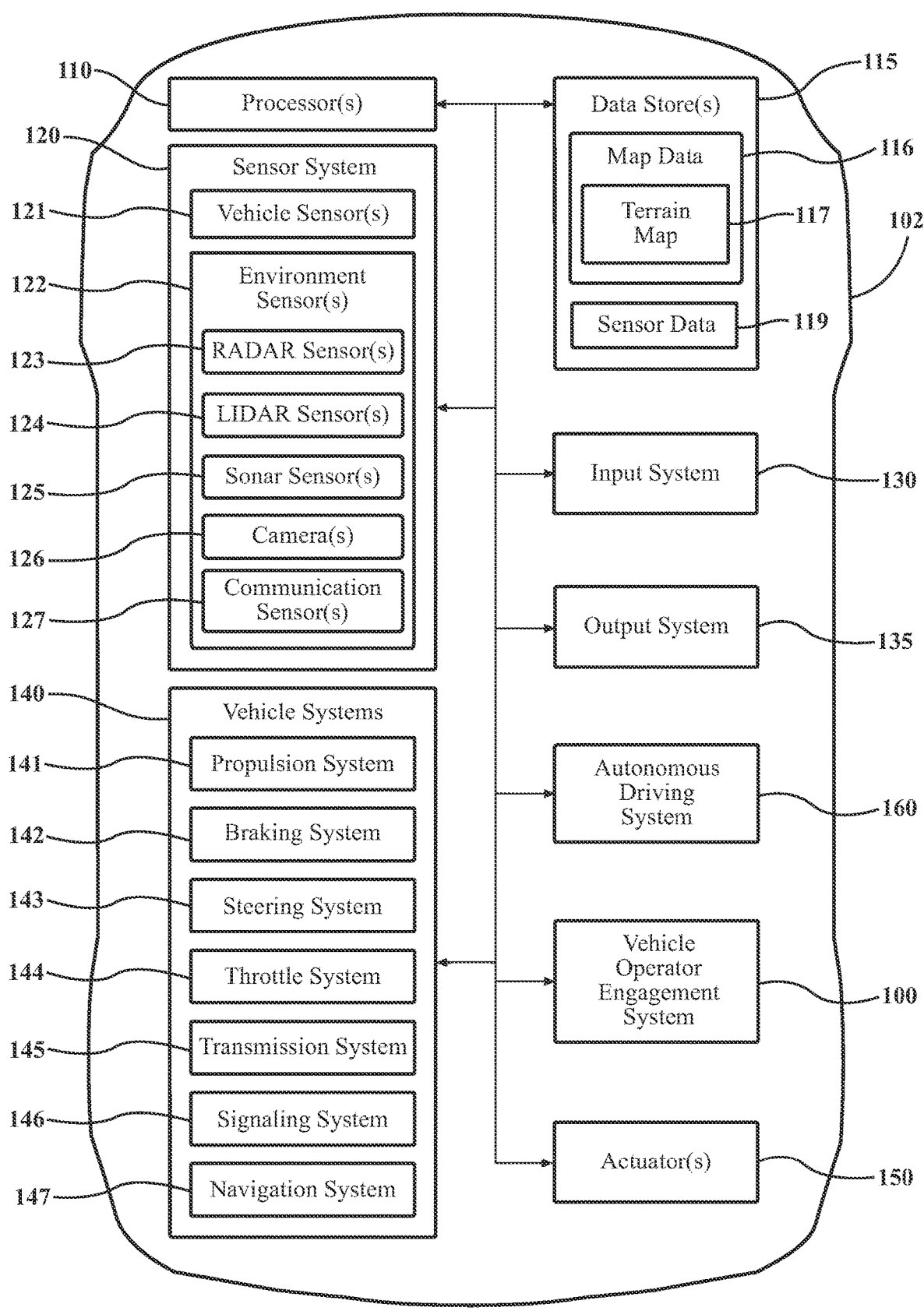
FIG. 1 illustrates a block diagram of a host vehicle incorporating a vehicle operator engagement system.

Systems, methods, and other embodiments associated with keeping an operator of an autonomous or semi-autonomous vehicle engaged is disclosed. The autonomous vehicle or a semi-autonomous vehicle may be at a Level 2 driving automation or a Level 3 driving automation. As such, the operator is required to remain alert and available to take over control of the vehicle. However, in a case where the vehicle travels mainly in an Operational Design Domain (ODD), which is a specific domain in which an automated driving system is designed to properly operate, there will be relatively few opportunities for the vehicle to request or require intervention from the operator. As such, the operator may begin to over-rely on the ability of the vehicle and may become inattentive during vehicle travel. This may lead to the operator being unprepared to take over control of a vehicle with L2 or L3 driving automation, which may unexpectedly disengage the autonomous vehicle control due to, as an example, sensor failure, changing weather condition, unexpected ODD changes (e.g., construction zone, accident scene), etc.

Accordingly, in one embodiment, the disclosed approach is a system that keeps an operator of a host vehicle that is semi-autonomous or autonomous engaged. The system may simulate an unplanned disengagement of the autonomous vehicle control in a safe environment such as an ODD, to prevent the operator from over-trusting the autonomous vehicle control. As an example, the system determines whether a disengagement ratio of the host vehicle is below a threshold value. A disengagement ratio is a ratio between a number of system-initiated disengagements to a predetermined time period. Disengagement refers to a status change from the autonomous vehicle control being engaged to being disengaged.

As disclosed above, when the host vehicle is travelling almost solely within the ODD, the host vehicle is capable of operating without any need for operator intervention. As such, the disengagement ratio will be low, e.g., 1:180, which means the system initiated disengagement once in 180 minutes, and the operator is likely to become distracted and inattentive.

Additionally and/or alternatively, the disengagement ratio may refer to a ratio between the amount of time the host vehicle is in a manual mode and the amount of time the host vehicle is in an autonomous mode. As disclosed above, when the host vehicle is travelling almost solely within the ODD, the host vehicle is capable of operating without any need for operator intervention. As such, the disengagement ratio will be low, e.g., 5:180, which is 5 minutes in manual mode to 180 minutes in autonomous mode, and the operator is likely to become distracted and inattentive.

The system may determine a threshold value at which the operator is likely to remain attentive, engaged, and/or responsive using historical information and research. The threshold value may be based on data specific to the operator of the host vehicle and/or data from multiple operators in multiple vehicles. As an example, a threshold value may be based on the number of disengagements such as 1:30 where for every thirty minutes, there is one system-initiated disengagement event. As another example, a threshold value may be based on time periods such as 1:14 where for one minute is in manual mode, fourteen minutes are in autonomous mode to keep the operator engaged.

As such, the system may switch the host vehicle from autonomous to manual mode, disengaging the automatic vehicle control to increase the number of disengagements and/or the time the host vehicle is in the manual mode, thus increasing the disengagement ratio. The system may physically switch from autonomous mode to manual mode, where one or more automatic vehicle systems are deactivated. Alternatively, the system may virtually switch from autonomous mode to manual mode, where the vehicle system(s) in autonomous mode remain in autonomous mode, but the system may portray an interactive simulation scenario to the operator showing how the host vehicle will operate if the vehicle system(s) are deactivated.

Before switching the host vehicle to the manual mode at an upcoming road segment, the system determines whether the driving conditions at the upcoming road segment are conducive for disengagement of autonomous vehicle control in the host vehicle. The system may receive information about road conditions, weather conditions, visibility conditions, and/or traffic conditions from vehicles ahead of the host vehicle that have already traversed the road segment that the host vehicle is approaching.

The system may determine whether the driving conditions are conducive for disengagement of the autonomous vehicle control in the host vehicle using any suitable algorithm such as the examples disclosed below.

Upon the system determining that the disengagement ratio is below the predetermined threshold value and the driving conditions are conducive for the disengagement of the autonomous vehicle control, the system disengages the autonomous vehicle control in the host vehicle for a predetermined time period, e.g., three minutes. After the three minutes, the system re-engages the autonomous vehicle control in the host vehicle.

The embodiments disclose herein present various advantages over current technologies. First, the embodiments can provide a safe method for keeping the operator engaged. Second, the embodiments can provide simulated scenarios without actually disengaging any of the autonomous vehicle control systems. Third, the embodiments can provide data for research on effective disengagement ratios and threshold values.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details.

Referring to FIG. 1, a block diagram of the host vehicle 102 incorporating a vehicle operator engagement system 100 is illustrated. The host vehicle 102 includes various elements. It will be understood that in various embodiments, it may not be necessary for the host vehicle 102 to have all of the elements shown in FIG. 1. The host vehicle 102 may have any combination of the various elements shown in FIG. 1. Further, the host vehicle 102 may have additional elements to those shown in FIG. 1. In some arrangements, the host vehicle 102 may be implemented without one or more of the elements shown in FIG. 1. While the various elements are shown as being located within the host vehicle 102 in FIG. 1, it will be understood that one or more of these elements may be located external to the host vehicle 102. Further, the elements shown may be physically separated by large distances.

Some of the possible elements of the host vehicle 102 are shown in FIG. 1 and will be described along with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, as illustrated in the embodiment of FIG. 1, the host vehicle 102 includes a vehicle operator engagement system 100 that is implemented to perform methods and other functions as disclosed herein relating to keeping an operator of an autonomous or semi-autonomous vehicle engaged. As will be discussed in greater detail subsequently, the vehicle operator engagement system 100, in various embodiments, may be implemented partially within the host vehicle 102 and may further exchange communications with additional aspects of the vehicle operator engagement system 100 that are remote from the host vehicle 102 in support of the disclosed functions. Thus, while FIG. 1 generally illustrates the vehicle operator engagement system 100 as being self-contained, in various embodiments, the vehicle operator engagement system 100 may be implemented within multiple separate devices some of which may be remote from the host vehicle 102.

Figure 2:
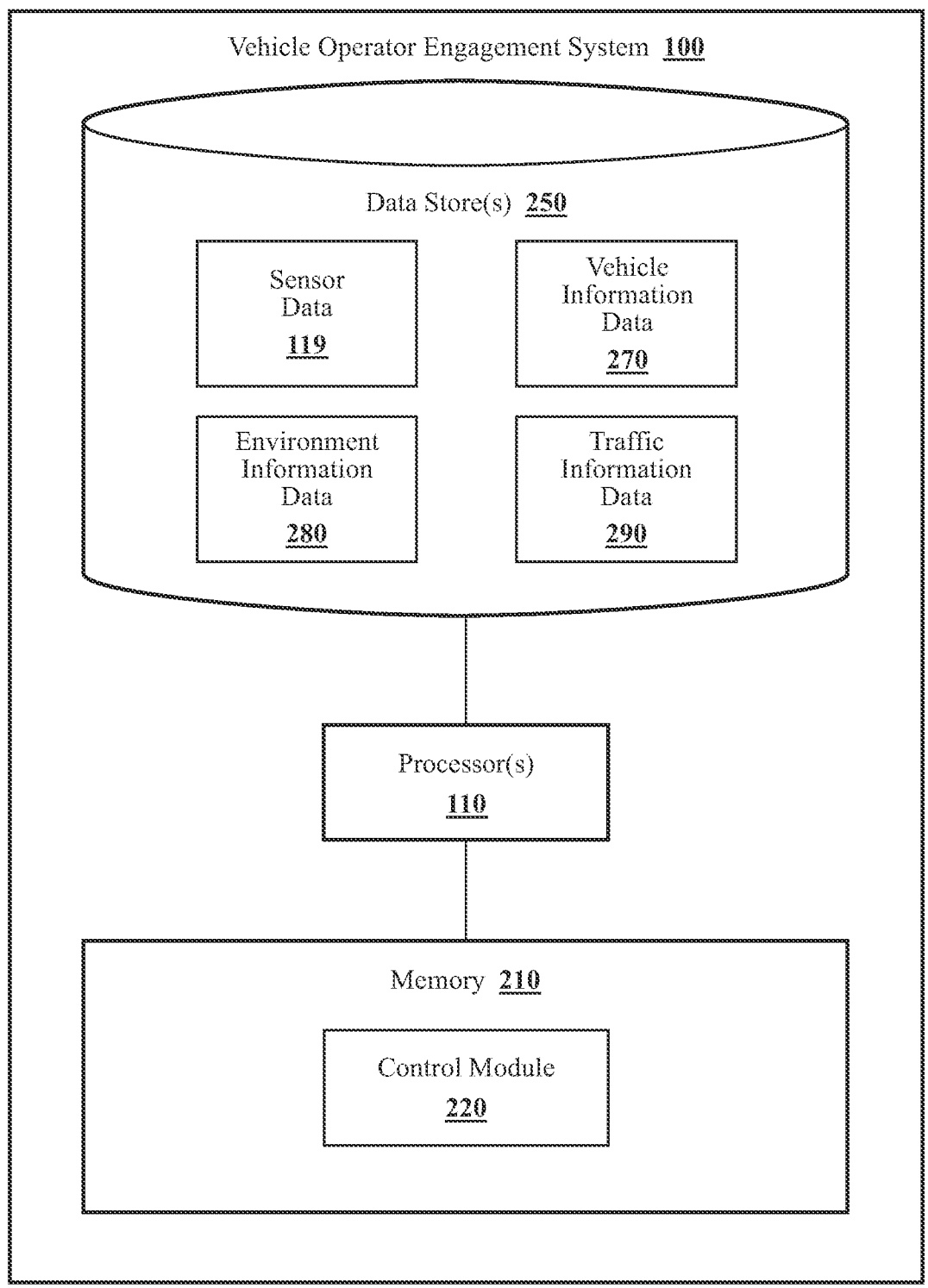
FIG. 2 is a more detailed block diagram of the vehicle operator engagement system of FIG. 1.

With reference to FIG. 2, a more detailed block diagram of the vehicle operator engagement system of FIG. 1 is shown. The vehicle operator engagement system 100 may include a processor 110 from the host vehicle 102 of FIG. 1. Accordingly, the processor 110 may be a part of the vehicle operator engagement system 100, the vehicle operator engagement system 100 may include a separate processor from the processor 110 of the host vehicle 102, and/or the vehicle operator engagement system 100 may access the processor 110 through a data bus or another communication path. In further aspects, the processor 110 is a cloud-based resource that communicates with the vehicle operator engagement system 100 through a communication network. In one embodiment, the vehicle operator engagement system 100 includes a memory 210 that stores a control module 220. The memory 210 is a random-access memory (RAM), read-only memory (ROM), a hard-disk drive, a flash memory, or other suitable memory for storing the control module 220. The control module 220 includes, for example, computer-readable instructions within the physical memory 210 that, when executed by the processor 110, cause the processor 110 to perform the various functions disclosed herein.

In one embodiment, the vehicle operator engagement system 100 includes a data store 250. The data store 250 is, in one embodiment, an electronic data structure (e.g., a database) stored in the memory 210 or another data store and that is configured with routines that may be executed by the processor 110 for analyzing stored data, providing stored data, organizing stored data, and so on. Thus, in one embodiment, the data store 250 stores data used by the control module 220 in executing various functions. In one embodiment, the data store 250 includes the sensor data 119 along with, for example, vehicle information data 270, environment information data 280, traffic information data 290, and or other information that is used by the control module 220.

The sensor data 119 may originate from the sensor system 120 of the host vehicle 102. Additionally and/or alternatively, the sensor data 119 may originate from one or more external sources. The external sources may include any entities capable of wireless communication such as other vehicles including surrounding vehicle(s), roadside units, servers, and/or databases. The sensor data 119 may include information about the environment within the host vehicle 102. Additionally and/or alternatively, the sensor data 119 may include detected vehicles and/or physical characteristics in the environment surrounding the host vehicle 102.

The vehicle information data 270 can include operator information such as operator identification and operator history. The vehicle information data 270 include information about the host vehicle 102 and the control mode that the host vehicle 102 is in. As an example, the host vehicle 102 can be in a semi-autonomous mode or an autonomous mode. As another example, one or more of the vehicle systems 140 in the host vehicle 102 can be at varying levels of manual or autonomous control. In such an example, one or more of the steering system 143, the throttle system 144, and/or the braking system 142 can be under manual control, autonomous control, or somewhere in between.

The environment information data 280 may include information about the environment surrounding the host vehicle 102 such as the location and condition of the road that the host vehicle 102 is travelling on. The location of the road(s) may include geographic coordinates of the road and the position of the road relative to a destination. The condition of the road can include information about the physical condition of the road such as the presence of potholes, road debris, vegetation, occlusions and/or the presence of road delineators such as lane markers, road edge markers, traffic signs, traffic lights, and communicative roadside units.

Additionally and/or alternatively, the environment information data 280 can include conditions in the environment such as a weather condition, a road condition, air quality, light levels, and/or a timestamp. A weather condition may include, as an example, presence of precipitation such as snow, rain, and/or hail. The weather condition may further include impacts of weather such as fog levels, fallen snow levels (i.e. the amount of snow on the ground), and/or flooding. As previously mentioned, the weather condition may be based on the current weather condition and/or the future weather condition. The environment information data 280 may be updated periodically and/or on-demand. The environment information data 280 may receive information from one or more databases such as an environment information database.

The traffic information data 290 may include traffic levels on the road as well as traffic rules based on the jurisdiction at the location of the road. The traffic information data 290 may receive information from one or more databases such as a traffic information database. The sensor data 119, the vehicle information data 270, the environment information data 280, and the traffic information data 290 may be digital data that describe information used by the vehicle operator engagement system 100 to control a vehicle system 140.

In one embodiment, the control module 220 includes instructions that function to control the processor 110 to determine whether a disengagement ratio of a host vehicle 102 is below a predetermined threshold value. The disengagement ratio is a ratio of a number of system-initiated disengagements to a predetermined time period. There are two types of disengagements—human-initiated disengagement and system-initiated disengagement. Human-initiated disengagement is where a human disengages (i.e., deactivates) the autonomous vehicle control by, as an example, rotating the steering wheel to change lanes or applying the brake pedal. System-initiated disengagement is where a system such as a vehicle system disengages the autonomous vehicle control.

The autonomous vehicle control (also known as the autonomous vehicle control system) may include the autonomous driving system 160, and one or more vehicle systems 140 which may be automatic such as propulsion system 141, braking system 142, steering system 143, etc. As such, when the autonomous vehicle control is disengaged, one or more of the autonomous driving system 160 and the vehicle systems 140 are disengaged (or deactivated). When the autonomous vehicle control is engaged, one or more of the autonomous driving system 160 and the vehicle systems 140 are engaged (or activated).

The control module 220 may monitor and record when the autonomous vehicle control is engaged and/or disengaged. Additionally and/or alternatively, the control module 220 may request and receive from the autonomous vehicle control and/or the autonomous driving system 160 how many times the autonomous vehicle control and/or the autonomous driving system 160 has been disengaged. The control module 220 may request and receive from the autonomous vehicle control and/or the autonomous driving system 160 how much time the autonomous vehicle control and/or the autonomous driving system 160 has been engaged and/or how much time the autonomous vehicle control and/or the autonomous driving system 160 has been disengaged. The control module 220 may update the disengagement ratio at any suitable interval such as at the end of a trip, once a day, one a week, at the end of a disengagement period, at the end of an engagement period, etc.

The predetermined threshold value is a ratio of how many times the autonomous vehicle control has been disengaged by the system to a predetermined time period. Additionally and/or alternatively, the predetermined threshold value may be based on a ratio of how much time the autonomous vehicle control is disengaged to how much time the autonomous vehicle control is engaged that is effective in keeping the operator engaged. The control module 220 may define the predetermined threshold value based on historical information and any suitable form of research. The predetermined threshold value may be based on general data for multiple operators and/or multiple vehicles. Additionally and/or alternatively, the predetermined threshold value may be customized or personalized to the operator and/or the vehicle. As such, the control module 220 may monitor past responses of the operator to the control module 220 engaging and disengaging the autonomous vehicle control and may whether determine the ratio of the amount of time the autonomous vehicle control is disengaged to the amount of time the autonomous vehicle control system is engaged that is effective for keeping the operator engaged. That ratio is the predetermined threshold value.

The control module 220 may compare the disengagement ratio to the predetermined threshold value to determine whether the disengagement ratio is lower than the predetermined threshold value. In such a case, the control module 220 may compare whether the frequency of system-initiated disengagements is lower than the frequency of system-initiated disengagements in the predetermined threshold value within the same amount of time. Additionally and/or alternatively, the control module 220 may compare whether the amount of time that the autonomous vehicle control is disengaged in relation to the disengagement ratio is lower than the amount of time that the autonomous vehicle control is disengaged in the predetermined threshold value within the same amount of time.

In one embodiment, the control module 220 includes instructions that function to control the processor 110 to determine whether driving conditions at an upcoming road segment are conducive for disengagement of autonomous vehicle control in the host vehicle 102. The control module 220 may identify the upcoming road segment using the navigation system 147. As an example, the control module 220 may request and receive information about the driving conditions of the upcoming road segment from vehicles travelling ahead that have already traversed the upcoming road segment. The control module 220 may communicate with the vehicles travelling ahead using any suitable method such as vehicle-to-vehicle (v2v) communication and/or via a server. As another example, the control module 220 may request and receive information about the driving conditions of the upcoming road segment from databases such as a traffic information database or an environment information database.

The driving conditions may include a road condition, a weather condition, a visibility condition, and/or a traffic condition. The road condition may include the type of road such as a highway, a country road, a city street, number of lanes, location of the road, etc. The road condition may include the condition of the surface of the road such as a tarred road, a gravel road, dry surface, a wet surface, a slippery surface, or a bumpy surface. The weather condition may include rain, snow, sun, fog, sleet, hail, etc. The visibility condition may include fog, heavy snowfall, rainfall, pollution, smoke, etc. The traffic condition may include an average number of vehicles traversing the upcoming road segment, the speed of the vehicles, etc. The driving conditions may include location, orientation, and direction of the upcoming road segment, the time of day as well as the time of year.

The control module 220 may determine whether the driving conditions at the upcoming road segment are conducive for disengagement of the autonomous vehicle control in the host vehicle 102 using any suitable method. The control module 220 may utilize any suitable algorithm such as a machine learning algorithm or an artificial intelligence process to determine whether the driving conditions of the upcoming road segment are conducive for disengagement. As an example, the control module 220 may include ideal criteria that is conducive for disengagement such as the type of road being a highway, the road having a dry surface, no other vehicles in close proximity to the host vehicle 102 at the upcoming road segment, late morning time period, and sunny weather. The control module 220 may then compare the current driving conditions of the upcoming road segment to the ideal criteria to determine whether the ideal criteria and the current driving conditions match. In the case where portions of the current driving conditions do not match the ideal criteria, the control module 220 may determine whether the variance between the current driving conditions and the ideal criteria is significant such that the current driving conditions are not conducive for disengagement. In the case that the current driving conditions match or do not vary significantly from the ideal criteria, the control module 220 may determine that the driving conditions are conducive for disengagement. As an example, the ideal criteria may vary based on factors such as the type of vehicle, the operator, and/or the type of autonomous vehicle control that is engaged.

In one embodiment, the control module 220 includes instructions that function to control the processor 110 to disengage the autonomous vehicle control in the host vehicle 102 in response to at least the disengagement ratio being below the predetermined threshold value and the driving conditions being conducive for the disengagement of the autonomous vehicle control. As an example, the control module 220 may physically disengage the autonomous vehicle control in the host vehicle 102. Additionally and/or alternatively, the control module 220 may disengage the autonomous vehicle control in the host vehicle 102 in a virtual manner. The control module 220 may apply a combination, physically disengaging one vehicle system and virtually disengaging another vehicle system.

The control module 220 may notify the operator prior to disengaging the autonomous vehicle control in any suitable format. As an example, the control module 220 may generate a notification by alerting an operator using one or more of an audio alert, a visual alert, or haptic alert. The control module 220 may generate a notification by outputting an electronic signal. The notification may include information about the disengagement such as when the disengagement is scheduled to commence, what autonomous vehicle control is being disengaged, how long the disengagement will last, and/or a recommended operator response/action. The recommended operator response/action may include a suggestion to the operator to place their hands on the steering wheel, to depress the brakes, and/or to depress the accelerator. The control module 220 may generate the notification in any suitable format such as text, images, and audio. As an example, the visual alert may be displayed on a display interface in the host vehicle 102 that is visible to the operator. As another example, the audible alert may be output on the vehicle speakers.

In the example where the control module 220 physically disengages the autonomous vehicle control, the control module 220 may deactivate one or more components of the autonomous vehicle control. As an example, the control module 220 may send an electronic signal to the host vehicle 102 to switch from the autonomous vehicle control to a manual control, thus switching all the vehicle systems from automatic control to manual control. As another example, the control module 220 may send an electronic signal to the host vehicle to deactivate one vehicle system such as deactivating the automatic steering system 143, the automatic propulsion system 141, the automatic throttle system 144, the automatic acceleration system, or the automatic braking system 142. In such an example, the control module 220 may deactivate one, two or all of the vehicle systems 140 presently being controlled by the autonomous driving system 160. As such, the autonomous driving system 160 may relinquish control of one vehicle system 140 while retaining control of another vehicle system 140.

In the example where the control module 220 virtually disengages the autonomous vehicle control, the control module 220 may notify the operator that the autonomous vehicle control has been virtually deactivated and may generate a virtual host vehicle in a simulation environment. The control module 220 may display information relating to the virtual deactivation in the simulation environment. As an example, the control module 220 may display the impact of the autonomous vehicle control being deactivated on a display screen. In such an example, the control module 220 may display the virtual host vehicle veering to one side in response to the automatic steering system being virtually deactivated, reducing speed in response to the automatic acceleration system being virtually deactivated, and/or maintaining (or increasing) speed in response to the automatic braking being virtually deactivated. The control module 220 may also notify the operator using audio to indicate that the virtual host vehicle in the simulation environment is veering to one side, reducing speed, maintaining speed, or increasing speed. The control module 220 may also notify the operator by moving a seat in the host vehicle 102.

As another example where the control module 220 virtually disengages the autonomous vehicle control, the control module 220 may request that the operator place their hands on the steering wheel, their foot on the brake pedal, and/or their foot on the accelerator pedal. The control module 220 may make the request without disengaging any of the vehicle systems 140 nor outputting an impact of the disengagement to the operator.

In one embodiment, the control module 220 includes instructions that function to control the processor 110 to determine whether characteristics of an operator of the host vehicle 102 are conducive for disengagement of autonomous vehicle control in the host vehicle 102. The control module 220 may disengage the autonomous vehicle control in the host vehicle 102 in response to at least the disengagement ratio being below the predetermined threshold value, the driving conditions being conducive for the disengagement of the autonomous vehicle control, and the characteristics of the operator of the host vehicle 102. As an example, the control module 220 may receive sensor data 119 indicating that the operator is awake or incapacitated. In the case that the control module 220 receives sensor data 119 indicating that the operator is incapacitated, the control module 220 may refrain from disengaging the autonomous vehicle control. As such, despite the disengagement ratio being below the predetermined threshold value and the driving conditions being conducive for the disengagement of the autonomous vehicle control, the control module 220 may refrain from disengaging the autonomous vehicle control in the host vehicle 102. In the case that the control module 220 receives sensor data 119 indicating that the operator is awake, the control module 220 may advance with disengaging the autonomous vehicle control in response to at least the disengagement ratio being below the predetermined threshold value, the driving conditions being conducive for the disengagement of the autonomous vehicle control, and the characteristics of the operator of the host vehicle 102. The characteristics of the operator may include an experience level of the operator.

In one embodiment, the control module 220 may determine whether, in response to disengaging the autonomous vehicle control in the host vehicle 102, an operator has taken control of the host vehicle 102. As an example, the control module 220 may request and receive sensor data 119 from sensors associated with the steering wheel, the accelerator pedal, and/or the brake pedal. The control module 220 may determine that the operator has taken control of the host vehicle 102 based on the sensor data 119 indicating that the operator is holding the steering wheel, depressing the accelerator pedal, and/or depressing the brake pedal. The control module 220 may determine that the operator has not taken control of the host vehicle 102 based on the sensor data 119 indicating that the operator is not holding the steering wheel, not depressing the accelerator pedal, and/or not depressing the brake pedal.

As another example, the control module 220 may request and receive sensor data 119 from motion sensors. The control module 220 may determine that the operator has taken control of the host vehicle 102 based on the sensor data 119 indicating that the host vehicle 102 is travelling within the lane boundaries, the host vehicle 102 is accelerating when the accelerator pedal should be depressed, and/or the host vehicle is decelerating when the brake pedal should be depressed. The control module 220 may determine that the operator has not taken control of the host vehicle based on the sensor data from the motion sensors indicating that the host vehicle is veering to one side, the host vehicle is not accelerating when the accelerator pedal should be depressed, and/or the host vehicle is not decelerating when the brake pedal should be depressed The control module 220 may maintain the disengagement for any predetermined time period. The predetermined time period may be based on historical information and/or research. In the case where the control module 220 physically disengaged the autonomous vehicle control and the operator has not taken control of the host vehicle, the control module 220 may re-engage the autonomous vehicle control to avoid danger. The control module 220 may re-engage the autonomous vehicle control earlier than the predetermined time period. The control module 220 may update the disengagement ratio based on the amount of time that the autonomous vehicle control was disengaged.

Figure 3:
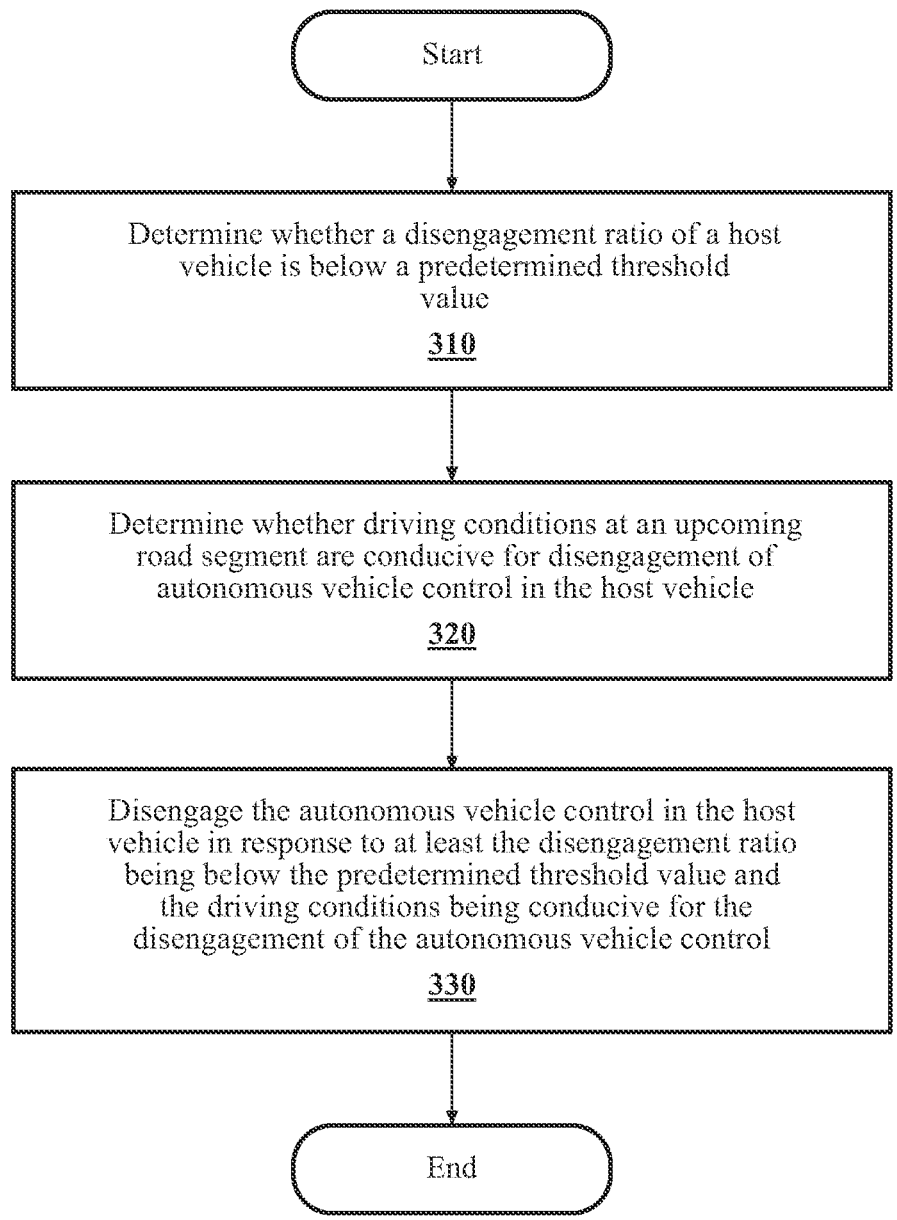
FIG. 3 is a flowchart illustrating one embodiment of a method associated with keeping an operator of the host vehicle that is semi-autonomous or autonomous engaged.

FIG. 3 illustrates a flowchart illustrating one embodiment of a method 300 associated with keeping an operator of the host vehicle that is semi-autonomous or autonomous engaged. The method 300 will be described from the viewpoint of the host vehicle 102 of FIG. 1 and the vehicle operator engagement system 100 of FIG. 2. However, the method 300 may be adapted to be executed in any one of several different situations and not necessarily by the host vehicle 102 of FIG. 1 and/or the vehicle operator engagement system 100 of FIG. 2.

At step 310, the vehicle operator engagement system 100 may cause the processor(s) 110 to determine whether a disengagement ratio of the host vehicle is at a predetermined threshold value. As previously mentioned, the control module 220 may determine the disengagement ratio as disclosed above, and further compare the disengagement ratio to the predetermined threshold also disclosed above.

At step 320, the vehicle operator engagement system may cause the processor(s) 110 to determine whether driving conditions at an upcoming road segment are conducive for disengagement of autonomous vehicle control in the host vehicle. As previously mentioned and as an example, the control module 220 may receive information about the driving conditions from vehicles travelling ahead of the host vehicle that have already traversed the upcoming road segment. The control module may then determine, using any suitable processes or algorithms, whether the driving conditions at the upcoming road segment is conducive for disengagement of the autonomous vehicle control in the host vehicle.

At step 330, the vehicle operator engagement system 100 may cause the processor(s) 110 to disengage the autonomous vehicle control in the host vehicle in response to at least the disengagement ratio being below the predetermined threshold value and the driving conditions being conducive for the disengagement of the autonomous vehicle control. As previously mentioned, the control module may physically or virtually disengage the autonomous vehicle control. The control module may then re-engage the autonomous vehicle control after a predetermined period has passed. Additionally and/or alternatively, the control module may monitor the operator and/or for a change in the driving conditions, and may re-engage the autonomous vehicle control if there is a change in the driving conditions such that the driving conditions are no longer conducive for disengagement of the autonomous vehicle control and/or if the operator does not take control of the host vehicle when the control module physically disengaged the autonomous vehicle control.

Figure 4:
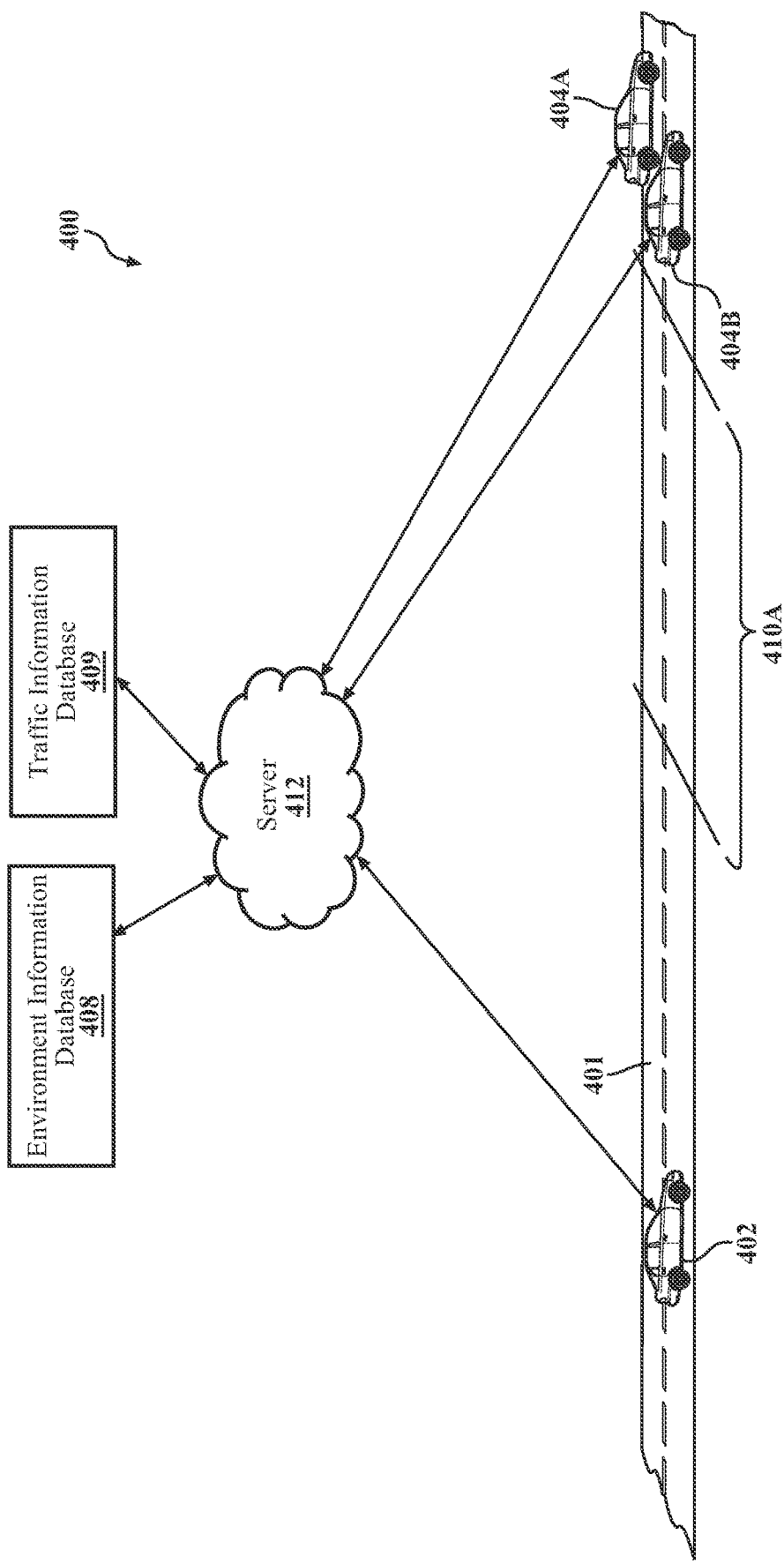
FIG. 4 is an example of a vehicle operator engagement scenario.

A non-limiting example of the operation of the vehicle operator engagement system 400 and/or one or more of the methods will now be described in relation to FIG. 4. FIG. 4 shows an example of a vehicle operator engagement scenario.

In FIG. 4, the host vehicle 402, which is similar to the host vehicle 102, is travelling on a two-lane road 401 and approaching an upcoming road segment 401A. Two vehicles 404A, 404B are travelling ahead of the host vehicle 402 and have already traversed the road segment 401A that is upcoming in relation to the host vehicle 402. In this example, the host vehicle 402 is connected to the vehicles 404A, 404B, an environment information database 408, and a traffic information database 409 via a server 412.

The vehicle operator engagement system 400, or more specifically, the control module 220 may receive sensor data 119 from the sensor system 120 in the vehicles 404A, 404B via the server 412, environment information data 280 from the environment information database 408 via the server 412, and traffic information data 290 from the traffic information database 409 via the server 412.

The vehicle operator engagement system 400, or more specifically, the control module 220 may determine whether a disengagement ratio of the host vehicle 402 is below a predetermined threshold value (e.g., one system-initiated disengagement every twenty minutes). As an example, the control module 220 may generate the disengagement ratio based on the number of times the autonomous vehicle control has been disengaged in the past week (i.e., the past seven days). In such an example and in the span of one week, the total travelling time of the host vehicle 402 is 520 minutes, the autonomous vehicle control has been disengaged 5 times within that time period, and the autonomous vehicle control has been engaged 500 minutes within that time period. As such, the disengagement ratio is 5:520 (or 1:104) and is lower than the predetermined threshold value in this example, which is 1:20.

The vehicle operator engagement system 700, or more specifically, the control module 220 may determine whether driving conditions at the upcoming road segment 401A are conducive for disengagement of autonomous vehicle control in the host vehicle 402. The control module 220 receives sensor data relating to the upcoming road segment 401A from the vehicles 404A, 404B, and additional information such as environment information data 280 from the environment information database 408, and traffic information data 290 from the traffic information database 409. The control module 220 may determine whether the driving conditions such as road conditions, weather conditions, visibility conditions, and traffic conditions are conducive for disengaging the autonomous vehicle control in the host vehicle 402. As previously mentioned, the control module 220 may determine whether the driving conditions are conducive based on any suitable analysis, process, or method.

In this example, the road 401 is straight, the weather is clear, there are no vehicles proximate to the host vehicle, and the control module 220 determines that these driving conditions are conducive for disengagement. As the host vehicle 402 approaches the upcoming road segment 401A, the control module 220 notifies the operator that the autonomous vehicle control is going to be disengaged, particularly, the automatic steering system and the automatic acceleration system. The control module 220 then disengages the autonomous vehicle control by deactivating the automatic steering system and the automatic acceleration system and starts a five-minute timer.

The control module 220 then monitors the motion of the host vehicle 402 to determine whether the operator has taken control of the host vehicle 402 and is controlling the host vehicle 402 in a safe manner. The control module 220 determines that the operator is controlling the host vehicle 402 in a safe manner as the host vehicle 402 remains within the lane boundaries and maintains a safe speed. As such, the control module 220 waits for the five-minute timer to expire and re-engages the automatic steering system and the automatic acceleration system.

FIG. 1 will now be discussed in full detail as an example environment within which the system and methods disclosed herein may operate. In some instances, the host vehicle 102 may be configured to switch selectively between an autonomous mode, one or more semi-autonomous operational modes, and/or a manual mode. Such switching may be implemented in a suitable manner, now known or later developed. "Manual mode" means that all of or a majority of the navigation and/or maneuvering of the vehicle is performed according to inputs received from a user (e.g., human driver). "Autonomous mode" refers to navigating and/or maneuvering the host vehicle 102 along a travel route using one or more computing systems to control the host vehicle 102 with minimal or no input from a human driver. In one embodiment, the host vehicle 102 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the host vehicle 102 along a travel route.

The host vehicle 102 may include one or more processors 110. In one or more arrangements, the processor(s) 110 may be a main processor of the host vehicle 102. For instance, the processor(s) 110 may be an electronic control unit (ECU). The host vehicle 102 may include one or more data stores 115 for storing one or more types of data. The data store 115 may include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 may be a component of the processor(s) 110, or the data store 115 may be operatively connected to the processor(s) 110 for use thereby. The term "operatively connected," as used throughout this description, may include direct or indirect connections, including connections without direct physical contact.

In one or more arrangements, the one or more data stores 115 may include map data 116. The map data 116 may include maps of one or more geographic areas. In some instances, the map data 116 may include information or data on roads, traffic control devices, road markings, structures, features, and/or landmarks in the one or more geographic areas. The map data 116 may be in any suitable form. In some instances, the map data 116 may include aerial views of an area. In some instances, the map data 116 may include ground views of an area, including 360-degree ground views. The map data 116 may include measurements, dimensions, distances, and/or information for one or more items included in the map data 116 and/or relative to other items included in the map data 116. The map data 116 may include a digital map with information about road geometry. The map data 116 may be high quality and/or highly detailed.

In one or more arrangements, the map data 116 may include one or more terrain maps 117. The terrain map(s) 117 may include information about the ground, terrain, roads, surfaces, and/or other features of one or more geographic areas. The terrain map(s) 117 may include elevation data in the one or more geographic areas. The terrain map(s) 117 may define one or more ground surfaces, which may include paved roads, unpaved roads, land, and other things that define a ground surface.

The one or more data stores 115 may include sensor data 119. In this context, "sensor data" means any information about the sensors that the host vehicle 102 is equipped with, including the capabilities and other information about such sensors. As will be explained below, the host vehicle 102 may include the sensor system 120. The sensor data 119 may relate to one or more sensors of the sensor system 120. As an example, in one or more arrangements, the sensor data 119 may include information on one or more LIDAR sensors 124 of the sensor system 120.

In some instances, at least a portion of the map data 116 and/or the sensor data 119 may be located in one or more data stores 115 located onboard the host vehicle 102. Alternatively, or in addition, at least a portion of the map data 116 and/or the sensor data 119 may be located in one or more data stores 115 that are located remotely from the host vehicle 102.

As noted above, the host vehicle 102 may include the sensor system 120. The sensor system 120 may include one or more sensors. "Sensor" means any device, component and/or system that may detect, and/or sense something. The one or more sensors may be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may work independently from each other. Alternatively, two or more of the sensors may work in combination with each other. In such a case, the two or more sensors may form a sensor network. The sensor system 120 and/or the one or more sensors may be operatively connected to the processor(s) 110, the data store(s) 115, and/or another element of the host vehicle 102 (including any of the elements shown in FIG. 2). The sensor system 120 may acquire data of at least a portion of the external environment of the host vehicle 102 (e.g., nearby vehicles).

The sensor system 120 may include any suitable type of sensor. Various examples of different types of sensors will be described herein. However, it will be understood that the embodiments are not limited to the particular sensors described. The sensor system 120 may include one or more vehicle sensors 121. The vehicle sensor(s) 121 may detect, determine, and/or sense information about the host vehicle 102 itself. In one or more arrangements, the vehicle sensor(s) 121 may be configured to detect, and/or sense position and orientation changes of the host vehicle 102, such as, for example, based on inertial acceleration. In one or more arrangements, the vehicle sensor(s) 121 may include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 may be configured to detect, and/or sense one or more characteristics of the host vehicle 102. In one or more arrangements, the vehicle sensor(s) 121 may include a speedometer to determine a current speed of the host vehicle 102.

Alternatively, or in addition, the sensor system 120 may include one or more environment sensors 122 configured to acquire, and/or sense driving environment data. "Driving environment data" includes data or information about the external environment in which the host vehicle 102 is located or one or more portions thereof. The one or more environment sensors 122 may be configured to detect, measure, quantify and/or sense other objects in the external environment of the host vehicle 102, such as, for example, other vehicles, the slope of the road, the condition of the surface of the road, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 may include one or more radar sensors 123, one or more LIDAR sensors 124, one or more sonar sensors 125, one or more cameras 126, and/or one or more communication sensors 127. In one or more arrangements, the one or more cameras 126 may be high dynamic range (HDR) cameras or infrared (IR) cameras. The communication sensor(s) 127 such as radio frequency identification (RFID) and near-field communication (NFC) readers may communicate with other entities using any suitable means of communication such as Wi-Fi, Bluetooth, vehicle-to-infrastructure (V2I) wireless communication, vehicle-to-everything (V2X) wireless communication, RFIC, and NFC.

The host vehicle 102 may include an input system 130. An "input system" includes any device, component, system, element or arrangement or groups thereof that enable information/data to be entered into a machine. The input system 130 may receive an input from a vehicle passenger (e.g., a driver or a passenger). The host vehicle 102 may include an output system 135. An "output system" includes any device, component, or arrangement or groups thereof that enable information/data to be presented to a vehicle passenger (e.g., a person, a vehicle passenger, etc.) such as a display interface.

The host vehicle 102 may include one or more vehicle systems 140. Various examples of the one or more vehicle systems 140 are shown in FIG. 2. However, the host vehicle 102 may include more, fewer, or different vehicle systems. It should be appreciated that although particular vehicle systems are separately defined, each or any of the systems or portions thereof may be otherwise combined or segregated via hardware and/or software within the host vehicle 102. The host vehicle 102 may include a propulsion system 141, a braking system 142, a steering system 143, throttle system 144, a transmission system 145, a signaling system 146, and/or a navigation system 147. Each of these systems may include one or more devices, components, and/or a combination thereof, now known or later developed.

The navigation system 147 may include one or more devices, applications, and/or combinations thereof, now known or later developed, configured to determine the geographic location of the host vehicle 102 and/or to determine a travel route for the host vehicle 102. The navigation system 147 may include one or more mapping applications to determine a travel route for the host vehicle 102. The navigation system 147 may include a global positioning system, a local positioning system or a geolocation system.

The host vehicle 102 may include one or more modules, at least some of which are described herein. The modules may be implemented as computer-readable program code that, when executed by a processor 110, implement one or more of the various processes described herein. One or more of the modules may be a component of the processor(s) 110, or one or more of the modules may be executed on and/or distributed among other processing systems to which the processor(s) 110 is operatively connected. The modules may include instructions (e.g., program logic) executable by one or more processor(s) 110. Alternatively, or in addition, one or more data store 115 may contain such instructions.

In one or more arrangements, one or more of the modules described herein may include artificial or computational intelligence elements, e.g., neural network, fuzzy logic or other machine learning algorithms. Further, in one or more arrangements, one or more of the modules may be distributed among a plurality of the modules described herein. In one or more arrangements, two or more of the modules described herein may be combined into a single module.

The host vehicle 102 may include one or more autonomous driving systems 160. The autonomous driving system(s) 160 either independently or in combination with the vehicle operator engagement system 100 may be configured to determine travel path(s), current autonomous driving maneuvers for the host vehicle 102, future autonomous driving maneuvers and/or modifications to current autonomous driving maneuvers based on data acquired by the sensor system 120, driving scene models, and/or data from any other suitable source such as determinations from the sensor data 119. "Driving maneuver" means one or more actions that affect the movement of a vehicle. Examples of driving maneuvers include: accelerating, decelerating, braking, turning, moving in a lateral direction of the host vehicle 102, changing travel lanes, merging into a travel lane, and/or reversing, just to name a few possibilities. The autonomous driving system(s) 160 may be configured to implement determined driving maneuvers. The autonomous driving system(s) 160 may cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving system(s) 160 may be configured to execute various vehicle functions and/or to transmit data to, receive data from, interact with, and/or control the host vehicle 102 or one or more systems thereof (e.g., one or more of vehicle systems 140).

The processor(s) 110, the vehicle operator engagement system 100, and/or the autonomous driving system(s) 160 may be operatively connected to communicate with the various vehicle systems 140 and/or individual components thereof. For example, the processor(s) 110, the vehicle operator engagement system 100, and/or the autonomous driving system(s) 160 may be in communication to send and/or receive information from the various vehicle systems 140 to control the movement, speed, maneuvering, heading, direction, etc. of the host vehicle 102. The processor(s) 110, the vehicle operator engagement system 100, and/or the autonomous driving system(s) 160 may control, activate, or deactivate some or all of these vehicle systems 140 and, thus, may be partially or fully autonomous. The processor(s) 110, the vehicle operator engagement system 100, and/or the autonomous driving system(s) 160 may cause the host vehicle 102 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The host vehicle 102 may include one or more actuators 150. The actuators 150 may be any element or combination of elements operable to modify, adjust and/or alter one or more of the vehicle systems 140 or components thereof to responsive to receiving signals or other inputs from the processor(s) 110 and/or the autonomous driving system(s) 160. Any suitable actuator may be used. For instance, the one or more actuators 150 may include motors, pneumatic actuators, hydraulic pistons, relays, solenoids, and/or piezoelectric actuators, just to name a few possibilities.

It will be appreciated that arrangements described herein may provide numerous benefits, including one or more of the benefits mentioned herein. For example, arrangements described herein may result in keeping the operator engaged while the host vehicle 102 is in motion. The arrangements described herein may also result in operators being better prepared to take over control from host vehicles at L2 or L3 driving automation levels.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4 but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above may be realized in hardware or a combination of hardware and software and may be realized in a centralized fashion in one processing system or in a distributed fashion where different elements are spread across several interconnected processing systems. Any kind of processing system or another apparatus adapted for carrying out the methods described herein is suited. A typical combination of hardware and software may be a processing system with computer-usable program code that, when being loaded and executed, controls the processing system such that it carries out the methods described herein. The systems, components and/or processes also may be embedded in a computer-readable storage, such as a computer program product or other data programs storage device, readable by a machine, tangibly embodying a program of instructions executable by the machine to perform methods and processes described herein. These elements also may be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that may contain, or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
a processor; and
a memory storing machine-readable instructions that, when executed by the processor, cause the processor to:
determine whether a disengagement ratio of a host vehicle is below a predetermined threshold value, the disengagement ratio of the host vehicle being at least one of a ratio between a number of system-initiated disengagements to a predetermined time period and a ratio between an amount of time that the host vehicle is in a manual mode and an amount of time that the host vehicle is in an autonomous mode;
determine whether driving conditions at an upcoming road segment are conducive for disengagement of autonomous vehicle control in the host vehicle, the driving conditions belonging to a domain in which the autonomous vehicle control is designed to operate; and disengage the autonomous vehicle control in the host vehicle in response to at least the disengagement ratio being below the predetermined threshold value and the driving conditions being conducive for the disengagement of the autonomous vehicle control.

2. The system of claim 1, wherein the driving conditions include at least one of:
   a road condition;
   a weather condition;
   a visibility condition; or
   a traffic condition.

3. The system of claim 1, wherein the machine-readable instructions further include instructions that when executed by the processor cause the processor to:
   receive the driving conditions from one or more vehicles that have traversed the upcoming road segment.

4. The system of claim 1, wherein the machine-readable instructions further include instructions that when executed by the processor cause the processor to:
   determine whether, in response to disengaging the autonomous vehicle control in the host vehicle, an operator has taken control of the host vehicle.

5. The system of claim 1, wherein the machine-readable instructions further include instructions that when executed by the processor cause the processor to:
   determine whether characteristics of an operator of the host vehicle are conducive for disengagement of autonomous vehicle control in the host vehicle; and
   disengage the autonomous vehicle control in the host vehicle in response to at least the disengagement ratio being below the predetermined threshold value, the driving conditions being conducive for the disengagement of the autonomous vehicle control, and the characteristics of the operator of the host vehicle.

6. The system of claim 1, wherein the machine-readable instructions further include instructions that when executed by the processor cause the processor to:
   disengage the autonomous vehicle control in the host vehicle in a virtual manner.

7. The system of claim 1, wherein the disengagement ratio is a ratio of a number of system-initiated disengagements to a predetermined time period.

8. A method comprising:
   determining whether a disengagement ratio of a host vehicle is below a predetermined threshold value, the disengagement ratio of the host vehicle being at least one of a ratio between a number of system-initiated disengagements to a predetermined time period and a ratio between an amount of time that the host vehicle is in a manual mode and an amount of time that the host vehicle is in an autonomous mode;
   determining whether driving conditions at an upcoming road segment are conducive for disengagement of autonomous vehicle control in the host vehicle, the driving conditions belonging to a domain in which the autonomous vehicle control is designed to operate; and
   disengaging the autonomous vehicle control in the host vehicle in response to at least the disengagement ratio being below the predetermined threshold value and the driving conditions being conducive for the disengagement of the autonomous vehicle control.

9. The method of claim 8, wherein the driving conditions include at least one of:
   a road condition;
   a weather condition;
   a visibility condition; or
   a traffic condition.

10. The method of claim 8, further comprising:
    receiving the driving conditions from one or more vehicles that have traversed the upcoming road segment.

11. The method of claim 8, further comprising:
    determining whether, in response to disengaging the autonomous vehicle control in the host vehicle, an operator has taken control of the host vehicle.

12. The method of claim 8, further comprising:
    determining whether characteristics of an operator of the host vehicle are conducive for disengagement of autonomous vehicle control in the host vehicle; and
    disengaging the autonomous vehicle control in the host vehicle in response to at least the disengagement ratio being below the predetermined threshold value, the driving conditions being conducive for the disengagement of the autonomous vehicle control, and the characteristics of the operator of the host vehicle.

13. The method of claim 8, further comprising:
    disengaging the autonomous vehicle control in the host vehicle in a virtual manner.

14. The method of claim 8, wherein the disengagement ratio is a ratio of a number of system-initiated disengagements to a predetermined time period.

15. A non-transitory computer-readable medium including instructions that when executed by a processor cause the processor to:
    determine whether a disengagement ratio of a host vehicle is below a predetermined threshold value, the disengagement ratio of the host vehicle being at least one of a ratio between a number of system-initiated disengagements to a predetermined time period and a ratio between an amount of time that the host vehicle is in a manual mode and an amount of time that the host vehicle is in an autonomous mode;
    determine whether driving conditions at an upcoming road segment are conducive for disengagement of autonomous vehicle control in the host vehicle, the driving conditions belonging to a domain in which the autonomous vehicle control is designed to operate; and
    disengage the autonomous vehicle control in the host vehicle in response to at least the disengagement ratio being below the predetermined threshold value and the driving conditions being conducive for the disengagement of the autonomous vehicle control.

16. The non-transitory computer-readable medium of claim 15, wherein the driving conditions include at least one of:
    a road condition;
    a weather condition;
    a visibility condition; or
    a traffic condition.

17. The non-transitory computer-readable medium of claim 15, wherein the instructions further include instructions that when executed by the processor cause the processor to:
    receive the driving conditions from one or more vehicles that have traversed the upcoming road segment.

18. The non-transitory computer-readable medium of claim 15, wherein the instructions further include instructions that when executed by the processor cause the processor to:
    determine whether, in response to disengaging the autonomous vehicle control in the host vehicle, an operator has taken control of the host vehicle.

19. The non-transitory computer-readable medium of claim 15, wherein the instructions further include instructions that when executed by the processor cause the processor to:
- determine whether characteristics of an operator of the host vehicle are conducive for disengagement of autonomous vehicle control in the host vehicle; and
- disengage the autonomous vehicle control in the host vehicle in response to at least the disengagement ratio being below the predetermined threshold value, the driving conditions being conducive for the disengagement of the autonomous vehicle control, and the characteristics of the operator of the host vehicle.

20. The non-transitory computer-readable medium of claim 15, wherein the instructions further include instructions that when executed by the processor cause the processor to:
- disengage the autonomous vehicle control in the host vehicle in a virtual manner.

\* \* \* \* \*